United States Patent
Gorju et al.

(10) Patent No.: US 11,735,883 B2
(45) Date of Patent: Aug. 22, 2023

(54) METHODS AND SYSTEMS FOR GENERATING HIGH PEAK POWER LASER PULSES

(71) Applicant: IMAGINE OPTIC, Orsay (FR)

(72) Inventors: Guillaume Gorju, Dourdan (FR); Adam Ayeb, Orsay (FR); Xavier Levecq, Gif-sur-Yvette (FR)

(73) Assignee: IMAGINE OPTIC, Orsay (FR)

( * ) Notice: Subject to any disclaimer, the term of this patent is extended or adjusted under 35 U.S.C. 154(b) by 448 days.

(21) Appl. No.: 16/972,514

(22) PCT Filed: May 31, 2019

(86) PCT No.: PCT/EP2019/064225
§ 371 (c)(1),
(2) Date: Dec. 4, 2020

(87) PCT Pub. No.: WO2019/233900
PCT Pub. Date: Dec. 12, 2019

(65) Prior Publication Data
US 2021/0273397 A1   Sep. 2, 2021

(30) Foreign Application Priority Data

Jun. 5, 2018 (FR) .................................... 1854860

(51) Int. Cl.
*H01S 3/094* (2006.01)
*H01S 3/23* (2006.01)
(Continued)

(52) U.S. Cl.
CPC ...... *H01S 3/094053* (2013.01); *G02B 26/002* (2013.01); *H01S 3/09415* (2013.01);
(Continued)

(58) Field of Classification Search
CPC ............... G02B 26/002; G02B 26/007; H01S 3/094053; H01S 3/0057; H01S 3/0085
See application file for complete search history.

(56) References Cited

U.S. PATENT DOCUMENTS

| 4,937,421 A | 6/1990 | Ortiz, Jr. et al. |
| 6,002,102 A | 12/1999 | Dulaney et al. |

(Continued)

FOREIGN PATENT DOCUMENTS

| EP | 1528645 A2 | 5/2005 |
| EP | 3029860 A1 | 6/2016 |

OTHER PUBLICATIONS

International Search Report issued in PCT/EP2019/064225 dated Sep. 30, 2019 (8 pages).

(Continued)

*Primary Examiner* — Eric L Bolda
(74) *Attorney, Agent, or Firm* — Osha Bergman Watanabe & Burton LLP

(57) ABSTRACT

The present description relates, according to one aspect, to a high-peak-power laser pulse generation system (10), comprising at least one first light source (101) for emitting first laser pulses ($I_L$), a fiber device (110) for transporting said first laser pulses, comprising at least one first multimode fiber with a single core designed to receive said first laser pulses, and a module (102) for temporally shaping said first laser pulses, arranged upstream of the fiber device, configured so as to reduce the power spectral density of said pulses by reducing the temporal coherence.

12 Claims, 11 Drawing Sheets

(51) Int. Cl.
*G02B 26/00* (2006.01)
*H01S 3/0941* (2006.01)

(52) U.S. Cl.
CPC ...... *H01S 3/094076* (2013.01); *H01S 3/2316* (2013.01); *G02B 26/007* (2013.01); *H01S 2301/206* (2013.01)

(56) References Cited

U.S. PATENT DOCUMENTS

| | | | |
|---|---|---|---|
| 6,818,854 B2 | 11/2004 | Friedman et al. | |
| 2008/0175280 A1* | 7/2008 | Bouma | H01S 3/08063 372/20 |
| 2009/0268271 A1* | 10/2009 | Reynolds | G02B 26/002 359/278 |
| 2012/0002686 A1 | 1/2012 | Bouma et al. | |
| 2014/0293404 A1 | 10/2014 | Pierrot et al. | |
| 2016/0352060 A1* | 12/2016 | Long | H01S 3/08059 |
| 2018/0080770 A1 | 3/2018 | Chamoun et al. | |

OTHER PUBLICATIONS

Written Opinion of the International Searching Authority issued in PCT/EP2019/064225 dated Sep. 30, 2019 (11 pages).
Pal, V. et al.; "Generating flat-top beams with extended depth of focus"; Applied Optics, vol. 57, No. 16, Jun. 1, 2018, pp. 4583-4589 (7 pages).
Nieuwenhuijzen, H.; "On the Doppler Frequency Shift of Light Using Rotating Mirrors"; Astronomical Institutes of the Netherlands, vol. 20, Dec. 31, 1969, pp. 300-308 (17 pages).
Bernal, L. et al.; "Optical Doppler shift measurement using a rotating mirror"; American Journal of Physics, US, vol. 75, No. 3. Mar. 1, 2007, pp. 216-219 (4 pages).
Di Teodoro, F. et al.; "SBS-managed high-peak-power nanosecond-pulse fiber-based master oscillator power amplifier"; Optics Letters, vol. 38, No. 13, Jul. 1, 2013, pp. 2162-2164 (3 pages).

* cited by examiner

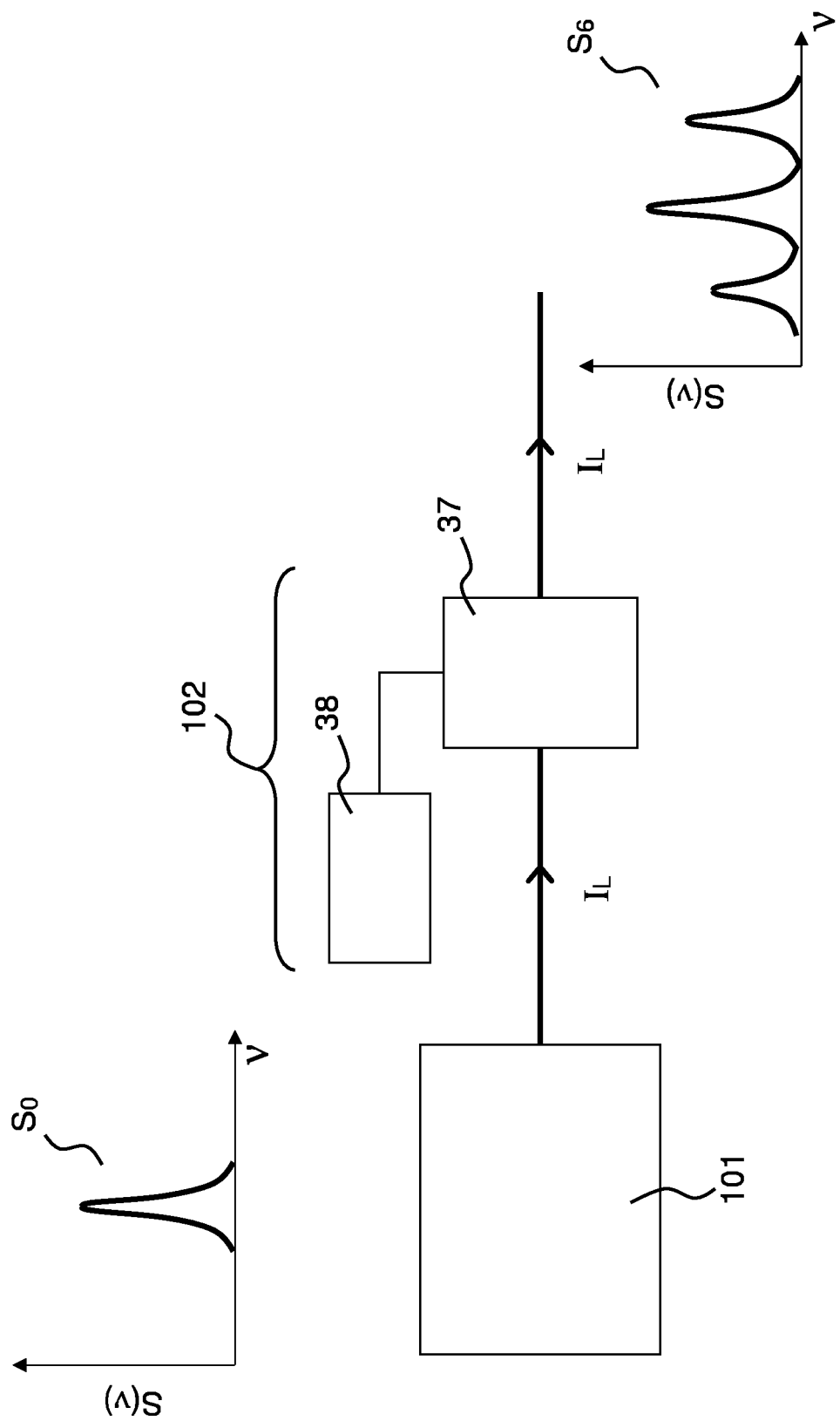

METHODS AND SYSTEMS FOR GENERATING HIGH PEAK POWER LASER PULSES

PRIOR ART

Technical Field of the Invention

The present description relates to methods and systems for generating high-peak-power laser pulses for laser shock purposes. The present description is applicable in particular in laser shock peening, laser shock spectroscopy, laser-based ultrasound generation or the laser cleaning of components.

Prior Art

Laser shock-based surface treatment applications, that is to say involving plasma formation, require pulses with a very high peak power, typically around 10 megawatts (MW) or more, that is to say typically pulses whose duration is of the order of a few tens of nanoseconds or less and which have energies of more than around one hundred millijoules. These pulses, typically focused on areas of a few $mm^2$, make it possible to achieve energy densities of the order of tens of Joules per square centimeter for the formation of laser shocks. These applications comprise for example laser shock spectroscopy, laser cleaning, laser-based ultrasound generation, for example in order to analyze the crystalline structure of a material, and laser shock peening for improving the service life and the mechanical resistance of parts.

Laser shock peening is described for example in U.S. Pat. No. 6,002,102 and EP1528645. A first absorbent thin layer is deposited on the part to be treated. During operation, high-peak-power laser pulses vaporize the absorbent layer, thereby generating a hot plasma. The expansion of the plasma causes an intense compression wave that makes it possible to generate prestresses deep in the material of the part to be treated. A second layer, called confinement layer, transparent to radiation, for example water or a material transparent to the wavelength of the incident radiation, for example quartz, helps the shock wave to relax toward the inside of the surface to be treated. This method, called "laser shock peening", makes it possible to increase the mechanical resistance of parts to cyclic fatigue. This method is generally performed by transporting the beam in free space to the area to be treated.

Transporting high-power laser beams in free space, however, creates safety problems and makes it very difficult to access confined or hostile places (submerged environments for example).

To access surfaces located in confined or hostile environments, optical fibers appear to be well-suited tools, as described for example in U.S. Pat. No. 4,937,421 or 6,818,854. However, some of the methods described above, such as laser shock peening or laser surface cleaning, are generally performed in dusty industrial environments, and the damage thresholds of the input and output surfaces of the fibers are thereby significantly reduced. Moreover, apart from cleanliness aspects, for pulsed lasers with a pulse duration of less than 1 µs, the peak power level able to be injected into a fiber is limited by the dielectric damage threshold of the material forming the core of the fiber. Thus, for pulses of 10 ns at 1064 nm, the damage threshold of the air/silica interface is around 1 $GW/cm^2$.

In order to limit the risks of damage upon injection and propagation, it is preferred to use waveguides with wide core diameters. However, large cores (typically greater than 1 mm) are not very flexible, and excessive curvatures create losses through evanescent waves that may damage the fiber. A set of optical fibers (or "bundle") may be used, as described for example in U.S. Pat. No. 6,818,854. However, in order to limit injection and propagation losses in this type of component, it is preferable to inject light energy into each fiber individually, thereby making injection complex and expensive; moreover, it is necessary to provide an optical focusing system with a large aperture at the output of the component, thereby making the optical system complex, expensive and bulky.

For these reasons in particular, the use of optical fibers for transporting pulses is limited in practice to transporting pulses with a relatively low peak power (less than 10 MW) and to addressing easily accessible areas (non-winding path).

There is therefore a need to generate high-peak-power pulses by way of a system with a fiber device, which makes it possible to increase the damage thresholds of the fibers and improve the flexibility of the fiber device in order to avoid optical deterioration thereof due to mechanical stresses.

One subject of the present description is a high-peak-power (typically around 10 MW or above) pulse generation method and system, allowing safe injection into a fiber device and ensuring safe propagation over long distances while at the same time maintaining great flexibility.

SUMMARY OF THE INVENTION

According to a first aspect, the present description relates to a high-peak-power laser pulse generation system, comprising:
   at least one first light source for emitting first nanosecond laser pulses comprising one or more laser line(s);
   a fiber device for transporting said first laser pulses, comprising at least one first multimode fiber with a single core designed to receive said first laser pulses;
   a module for temporally shaping said first laser pulses, arranged upstream of the fiber device, configured so as to reduce the power spectral density by reducing the temporal coherence of said first pulses, said temporal shaping module comprising a rotating reflective device rotating about a given axis of rotation, configured so as to reflect said first incident pulses with Doppler spectral broadening.

In the present description, the term "high peak power" is understood to mean laser pulses having a peak power of the order of, or greater than or equal to, 10 MW. Such pulses are suitable, after being focused on surface areas of a few $mm^2$, typically between 0.1 and 10 $mm^2$, for generating laser shocks in a given material, for example for laser shock peening applications, surface cleaning, ultrasound generation, spectroscopy, etc.

The term "nanosecond pulse" is understood to mean a pulse whose duration is between 1 ns and 100 ns, advantageously between 5 nanoseconds and 20 nanoseconds, which corresponds to a preferred pulse duration for laser shock generation. Said first pulses may comprise one or a plurality of laser lines.

The system thus described makes it possible, by virtue of the reduction in the power spectral density (PSD) by reducing the temporal coherence of the pulses upstream of the fiber device, to have very high peak powers for the pulses incident on the material in which it is desired to generate laser shocks while at the same time safeguarding the input and output interfaces of the fiber device. Specifically, reducing the temporal coherence makes it possible to reduce the PSD with a limited reduction in energy. Reducing the PSD with quasi-constant energy or with a slight reduction in energy makes it possible to limit intensity spikes attributed to speckle, to safeguard the injection into the fiber device and to limit non-linear effects. It is then possible to use a multimode fiber of small diameter, typically less than 1 mm, advantageously less than 300 thereby bestowing greater flexibility on the fiber device, and therefore allowing easier access to confined environments, with fiber curvature diameters that may be reduced to less than 15 cm.

The temporal shaping module defined in the present description enables broadening of the spectrum of the laser line(s) contained in said first pulses.

The temporal shaping module is thus configured so as to reduce the power spectral density such that the light intensity of the pulses is below the Brillouin scattering threshold stimulated in the fiber device. Light energy losses caused by non-linear effects in the fibers, in particular the Brillouin effect, are thus limited. The Brillouin scattering threshold decreases when the diameter of the fiber decreases (and the length of the fiber increases) and increases when the spectral width of the source becomes greater than the spectral width of the Brillouin line. Thus, by reducing the PSD of the laser pulses, for example by broadening the spectrum or increasing the number of laser lines, it is possible to keep a high Brillouin scattering threshold while at the same time reducing the core diameters and/or increasing the fiber length. Specifically, the calculation of the Brillouin threshold takes into account the convolution between the spectral profile of the source and that of the Brillouin gain.

According to one or more exemplary embodiments, the reduction in the PSD is furthermore obtained by increasing the number of laser line(s) contained in said first pulses, for example by way of an acousto-optic modulator. Advantageously, the number of laser line(s) contained in said first pulses is increased upstream of the spectral broadening.

According to one or more exemplary embodiments, the rotating reflective device is oscillating or rotating about said axis of rotation. It comprises one or more reflective surfaces. The pulses incident on the or said reflective surface(s) experience a spatially variable Doppler shift due to the variable angular velocity at each point of the or said surface(s). The laser pulses reflected by said rotating reflective device thus exhibit spectral broadening and therefore a decrease in the PSD. In addition, the spatial and temporal coherences of the laser pulses are reduced, thereby helping to limit speckle effects and non-linear effects.

According to one or more exemplary embodiments, the or said reflective surface(s) are arranged in planes perpendicular to one and the same plane, called plane of incidence of the first pulses, comprising the directions of the wave vectors of said first laser pulses incident on the rotating reflective device and reflected by said rotating reflective device.

According to one or more exemplary embodiments, the axis of rotation of said rotating reflective device is perpendicular to said plane of incidence of said first laser pulses.

According to one or more exemplary embodiments, with said first pulses being emitted at a given repetition frequency, the rotational or oscillating speed of said rotating reflective device is synchronized with the repetition frequency of said first pulses, such that each of said first pulses is incident on a reflective surface of said rotating reflective device with a constant angle of incidence.

According to one or more exemplary embodiments, said rotating reflective device comprises a simple mirror exhibiting rotational or oscillating movement about an axis perpendicular to a plane of incidence of said first laser pulses. For example, the reflective mirror is arranged such that said first laser pulses are incident on the rotating mirror in a direction perpendicular to the plane of said mirror.

According to one or more exemplary embodiments, said rotating reflective device comprises a plurality of reflective surfaces, two consecutive surfaces forming a non-zero angle, and deflector mirrors for returning each of said first pulses to each of said reflective surfaces. For example, the plurality of reflective surfaces are arranged on the faces of a polygon. By increasing the number of reflective surfaces, it is possible to increase Doppler broadening. Thus, for example, with N reflective surfaces (N≥2) and N−1 deflector mirrors, the Doppler broadening is multiplied by N.

According to one or more exemplary embodiments, at least one of said reflective surfaces is non-planar (for example concave or convex). For example, the reflective output surface, that is to say from which the laser pulse is reflected last, is not planar in order to introduce a convergence or divergence effect on said pulse.

According to one or more exemplary embodiments, the light beam formed by said first laser pulses and incident on the or said reflective surface(s) has dimensions smaller than the dimensions of the or said reflective surface(s).

According to one or more exemplary embodiments, the laser pulse generation system furthermore comprises a module for spatially shaping said first laser pulses upstream of the fiber device.

According to one or more exemplary embodiments, the spatial shaping module is configured so as to standardize the power spatial density of said pulses at the input of the fiber device. Standardizing the power spatial density makes it possible to limit intensity spikes in the fiber that are linked to the Gaussian intensity distribution of a beam, for example.

For example, the module for spatially shaping the pulses makes it possible to form pulses whose intensity spatial distribution is of "top hat" type, that is to say with a low intensity spatial variation, typically limited to +/−10% (excluding granular effects linked to speckle). "Top hat" spatial shaping furthermore makes it possible to adapt the light beam formed by said first pulses to the dimension of the core of the multimode fiber.

According to one or more exemplary embodiments, the laser pulse generation system furthermore comprises at least one first optical amplifier for amplifying said first pulses at the output of the fiber device. Such an optical amplifier may make it possible to compensate any loss of energy resulting from the use of the temporal shaping module.

According to one or more exemplary embodiments, the laser pulse generation system furthermore comprises at least one pump light source for emitting at least one first pump laser beam, intended for the optical pumping of said at least one first amplifier.

The pump light source comprises for example a laser diode or a laser diode assembly.

The pump source may be continuous or pulsed with a relatively low repetition rate, typically at the repetition frequency of said first laser pulses, that is to say less than a few kilohertz.

According to one or more exemplary embodiments, the pump source is temporally shaped so as to deliver pump pulses whose duration corresponds substantially to the lifetime of the excited level of said at least one first optical amplifier, that is to say typically of the order of a few hundred microseconds. It is also possible to spatially shape the pump beams, for example in order to adapt the size of the pump beam to the core diameter of the first multimode fiber.

According to one or more exemplary embodiments, said at least one pump laser beam is injected into the fiber device, with said first pulses. The transportation in the fiber and the pumping of the amplifying medium of said at least one first optical amplifier is then copropagative. As an alternative, the optical pumping of the amplifying medium may be transverse thereto, for example by way of laser diodes.

According to one or more exemplary embodiments, said laser pulse generation system comprises a plurality of optical amplifiers, arranged for example in succession.

According to one or more exemplary embodiments, the fiber device comprises, at input, said first multimode fiber and a set of slightly multimode fibers coupled with said first multimode fiber, forming for example what is called a first "photonic lantern", and, at output, a second multimode fiber, coupled with said slightly multimode fibers and comprising a single core for the output of said first laser pulses. The fiber device thus comprises two head-to-tail "photonic lanterns".

In the present description, a slightly multimode fiber is the name given to a fiber comprising fewer than 10000 modes, typically between 500 and 10000 modes. The diameter of the slightly multimode fiber is for example between 0.05 and 0.2 mm. The multimode fiber (input fiber of the photonic lantern) comprises more than 20000 modes. The diameter of the multimode fiber is for example between 0.5 and 1 mm.

Such a fiber device, comprising two head-to-tail "photonic lanterns", allows laser pulses to be transported in slightly multimode fibers of smaller diameter, and therefore makes it possible to gain even more flexibility for the transportation of laser pulses, allowing even easier access to confined environments, while at the same time keeping a single multimode core at input and at output.

According to one or more exemplary embodiments, the fiber device comprises at least one doped fiber for optically pre-amplifying said first laser pulses. This may be said first multimode fiber or one or more slightly multimode fibers in the case of using photonic lanterns. The optical pre-amplification makes it possible to even further minimize the amount of energy to be injected into the first multimode fiber.

As an alternative, according to one or more exemplary embodiments, the fiber device is not doped. Its function is limited to transporting said first laser pulses.

According to one or more exemplary embodiments, the laser pulse generation system comprises a second light source for emitting second laser pulses. The second laser pulses have for example a wavelength different from the first laser pulses. The second laser pulses are advantageously transported by the same fiber device as the first laser pulses. According to one or more exemplary embodiments, the laser pulse generation system comprises a second optical amplifier arranged at the output of said fiber device for amplifying said second laser pulses.

According to one or more exemplary embodiments, the laser pulse generation system furthermore comprises means for focusing said high-peak-power laser pulses at the output of the fiber device, for example at the output of said at least one optical amplifier when this is present.

According to one or more exemplary embodiments, the laser pulse generation system furthermore comprises means for moving a distal end of the fiber device. When there is a need to generate laser shocks at various locations of a material, for example in the case of the treatment of a surface, it is possible to move the material or move the distal end of the fiber device, that is to say the end opposite the proximal end located on the side of the source.

According to a second aspect, the present description relates to a high-peak-power laser pulse generation method, comprising:

emitting first nanosecond laser pulses;

transporting said first laser pulses via a fiber device comprising at least one first multimode fiber with a single core into which said first laser pulses are injected;

temporally shaping said first laser pulses prior to transportation by said fiber device, said temporal shaping comprising reduction of the power spectral density by reducing the temporal coherence by way of a rotating reflective device rotating about a given axis of rotation, configured so as to reflect said first incident pulses with Doppler spectral broadening.

The method thus described makes it possible to broaden the line(s) contained in said first pulses.

According to one or more exemplary embodiments, said temporal shaping furthermore comprises increasing the number of line(s) contained in said first pulses.

According to one or more exemplary embodiments, the laser pulse generation method furthermore comprises spatially shaping said first laser pulses.

According to one or more exemplary embodiments, said spatial shaping comprises standardizing the intensity spatial distribution of said first laser pulses.

According to one or more exemplary embodiments, the laser pulse generation method furthermore comprises optically amplifying said first laser pulses by way of at least one first optical amplifier arranged at the output of the fiber device in order to form said high-peak-power laser pulses.

According to one or more exemplary embodiments, the laser pulse generation method furthermore comprises injecting, into said fiber device, at least one first pump laser beam for the pumping of said at least one optical amplifier.

BRIEF DESCRIPTION OF THE FIGURES

Other advantages and features of the invention will become apparent on reading the description, illustrated by the following figures:

FIGS. 3A-3B show diagrams illustrating the temporal shaping of the pulses prior to transportation by the fiber device, in one example of a high-peak-power pulse generation system according to the present description, intended to increase the number of laser lines;

For the sake of consistency, identical elements are denoted using the same references in the various figures.

DETAILED DESCRIPTION

What is of interest in the present description is the generation of high-peak-power pulses, suitable for generating laser shocks in a material.

The interaction of high-illumination pulses (light power delivered per unit area), typically of the order of a few million watts per $cm^2$, with a material causes sudden heating of the illuminated surface and vaporization thereof in the form of a plasma that relaxes. This is what is called a laser shock. Laser shock is a mechanism in which the light/material interaction time is very short, typically a few tens of nanoseconds, and as a result, there is no significant temperature rise in the part to be treated, just as for laser cutting or laser welding methods. Laser shock may be promoted in one direction using a confinement layer. Specifically, in the absence of a confinement layer, the expansion of the laser shock takes place over $4\pi$ steradians.

More precisely, in the case of laser shock peening, the laser shock thus created makes it possible to introduce, with very high accuracy, deep residual compressive stresses on a material. This ultimately makes it possible to increase fatigue resistance by delaying the initiation and propagation of cracks. A confinement layer furthermore makes it possible to promote the relaxation of the plasma toward the inside of the part to be treated and to improve the effectiveness of the treatment.

In the case of LIBS (abbreviation for "Light Induced Breakdown Spectroscopy"), laser shock causes the surface to be treated to vaporize. The atoms and the ions that are ejected are brought to excited energy levels and emit, by de-exciting, a spectrum consisting of atomic lines, the wavelength of which makes it possible to identify the elements present and the intensity of which is proportional to the concentration of the emitting atoms.

In the case of ablation cleaning, the plasma created on the surface under the effect of the radiation relaxes, thus causing fractionation and expulsion of the dirt without damaging the surface to be cleaned.

In laser-generated ultrasound testing, the ultrasonic wave formed by the plasma resulting from the pulse/matter interaction is used. The ultrasonic wave propagates in the material and is reflected at the interfaces. The deformation of the material upon arrival of the ultrasonic wave may be analyzed using an interferometer coupled to a second laser beam. This analysis may provide information about several features linked to the material, namely its thickness, its microscopic structure, or even possible underlying defects, for example.

Figure 1:
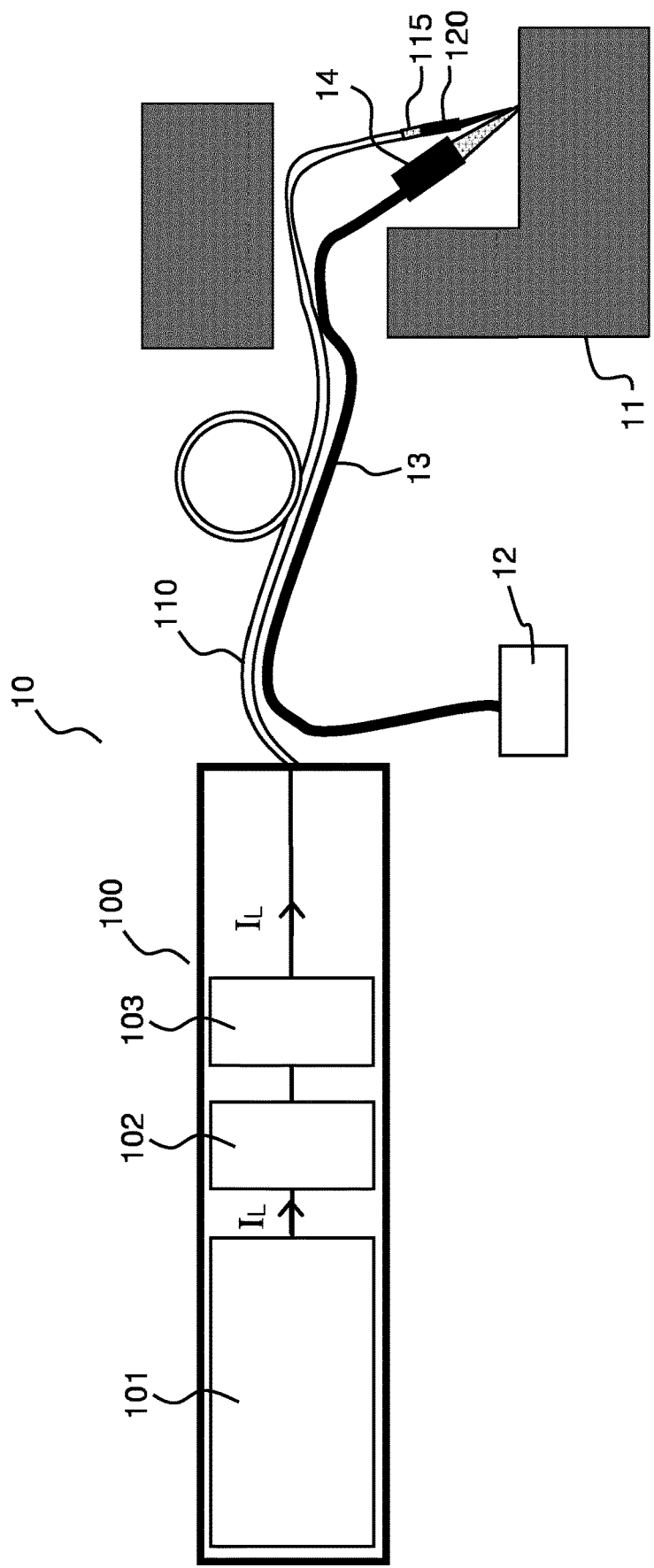
FIG. 1 shows a diagram illustrating a high-peak-power pulse generation system according to the present description and its implementation in a confined environment.

FIG. 1 shows a diagram illustrating a high-peak-power pulse generation system 10 according to the present description and its implementation within a confined environment 11. The system 10 comprises, in an enclosure 100 that may be air-conditioned and isolated from dust and moisture, at least one first light source 101 for emitting first laser pulses $I_L$.

The light source 101 is for example a pulsed laser, emitting pulses with a duration of between 1 and 100 ns, advantageously between 5 and 20 ns. The light source emits for example at 1.064 μm (emission wavelength of neodymium (Nd):YAG lasers) or at 1.030 μm (emission wavelength of ytterbium (Yb):YAG lasers). The light source 101 may comprise, without limitation, a solid laser, a fiber laser, a semiconductor laser, a disk laser or a combination of such lasers.

The light source may emit laser pulses with a single laser line or with a plurality of laser lines.

A plurality of light sources may also be provided, for example at various wavelengths for emitting first pulses and at least second pulses at different wavelengths.

The system 10 may also comprise, within the enclosure 100, a temporal shaping module 102 and/or a spatial shaping module 103, for example intended to reduce the temporal and/or spatial coherence of the first laser pulses and/or to form pulses with a substantially constant intensity profile. These spatial and/or temporal shaping modules are intended in particular to reduce intensity spikes or "hotspots" at the input of the fiber device and to limit non-linear effects. Some examples of a temporal and spatial shaping module will be described in the remainder of the description.

In the example shown in FIG. 1, at the output of the temporal 102 and spatial 103 shaping modules, the first laser pulses are injected into a fiber device 110. The fiber device 110 makes it possible to transport the laser pulses emitted by the or said light source(s); it may comprise a single multimode fiber with a single core designed to receive said laser pulses. In other examples, it may comprise a plurality of optical fibers, always with a first multimode optical fiber comprising a single core designed to receive all of the laser pulses.

When the system 10 is used for example for laser shot peening, it is also possible to provide, for the formation of the confinement layer, a water nozzle 14 supplied by a water tank and a pump 12 delivering water to the nozzle 14 by way of a hose 13. Water is not mandatory, and the confinement layer may just as easily be obtained using a gel, a paint or a solid material transparent to the wavelength of the pulses (for example quartz). It is also possible to dispense with the confinement layer, but this reduces the depth of the prestress induced by the laser shock peening process. The confinement layer is also not useful in applications other than laser shock peening.

The system 10 may also comprise movement means (not shown) for moving a distal end of the fiber device. When there is a need to generate laser shocks at various locations of a material, for example in various areas of a surface in the case of treating a surface, the material may be moved or the distal end of the fiber device, that is to say the end opposite the proximal end located on the side of the source, may be moved, and the surface to be treated may thus be spatially swept over by the laser pulses.

The system 10 may also comprise, according to one exemplary embodiment, an optical component 115 for spatially shaping the pulses at the output of the fiber device. The optical component 115 is for example a diffractive optical component, for example a DOE (for "Diffractive Optical Element"), a microlens system, an optical condenser or a Powell lens. In the case of spatial sweeping of the part to be treated by the laser pulses, this shaping may make it possible for example to adapt to the geometry of the part to be treated in order to minimize the overlap between the various areas of the part that it is desired to illuminate, and thus achieve a gain in terms of speed.

FIGS. 2A-2D, on the one hand, and 3A-3B, on the other hand, illustrate various means for temporally shaping the pulses prior to transportation by the fiber device, in one example of a high-peak-power pulse generation system according to the present description, intended to reduce the power spectral density (PSD) of the laser pulses, either by broadening the laser lines or by increasing the number of laser lines contained in the pulses.

Reducing the PSD makes it possible to limit non-linear effects in the fiber(s) of the fiber device 110 and to reduce the temporal coherence of the laser pulses, thereby making it possible to limit intensity spikes.

For example, the applicant has shown that it could be advantageous, in a high-peak-power laser pulse generation system according to the present description, to reduce the PSD so as to be, for a given fiber diameter and a given length of the fiber device, below the Brillouin scattering threshold stimulated in the fiber device.

Specifically, under the effect of temperature, the molecules that form the optical fiber make small movements around their original position. This leads to the occurrence of phonons that modify the refractive index of the core of the fiber, in the form of low-amplitude acoustic waves. When a light wave passes through this medium, it is scattered by these acoustic waves, and the scattering is accompanied by a Doppler effect due to the mobility of the acoustic waves (spontaneous Brillouin effect). When the scattered wave propagates in the same direction as the incident optical wave, this is called a Stokes wave. When the scattered wave propagates in a direction opposite the incident wave, this is called an anti-Stokes wave.

When the incident wave has a very high energy, by interfering with the Stokes wave, it will create an intensity modulation and a highly contrasted index grating in the fiber. This phenomenon, called electrostriction, is accompanied by stimulated scattering that has an exponential gain for the anti-Stokes wave; this is called the Stimulated Brillouin Gain. The stimulated wave is backscattered in the form of a counter-propagating wave, thus leading to significant energy losses for the wave transmitted in the fiber.

The stimulated Brillouin gain occurs only for a light intensity guided in the fiber that is greater than a threshold intensity, called the Brillouin threshold ($P_{th}$). Beyond the Brillouin threshold, the intensity of the wave backscattered in the opposite direction increases exponentially. The Brillouin threshold is defined by (see for example P. Singh et al. "*Nonlinear scattering effects in optical fibers*", Progress In Electromagnetics Research, PIER 74, 379-405, 2007):

$$P_{th} = \frac{21 \cdot K \cdot A_{eff}}{g_B \cdot L_{eff}} \cdot \frac{\Delta v \otimes \Delta v_B}{\Delta v_B}$$

where $A_{eff}$ is the effective area of the core of the fiber, $L_{eff}$ is the effective length of the fiber, K is a constant linked to the polarization of the transported radiation, which may vary from 1 to 2, and $g_B$ is the Brillouin gain, $\Delta v$ is the width of the spectrum injected from said first pulses into the fiber (spectral extent of the PSD), and $\Delta v_B$ is the width of the Brillouin gain. For a monochromatic wave and at ambient temperature, the Brillouin gain has a width of the order of 20 MHz. Thus, if the incident spectrum is shifted (or broadened) by more than 20 MHz, the stimulated Brillouin effect tends to decrease. In other words, the more monochromatic the light waves (with great temporal coherence), the more easily the stimulated Brillouin effect occurs.

The above equation shows that, for small fiber core diameters of the fiber device (this being sought in order to achieve a gain in terms of flexibility), the Brillouin threshold is lowered. To increase the Brillouin threshold, it is possible for example to seek to broaden the spectrum of the laser line(s) contained in the laser pulses injected into the fiber device or to increase the number of this or these line(s).

FIGS. 2A to 2D illustrate examples of suitable modules for temporally shaping the first laser pulses, making it possible to the broaden the spectrum of the laser line(s) contained in said first pulses.

As previously explained, the spectral broadening of the laser line(s) makes it possible to reduce non-linear effects in the fiber(s) of the fiber device, in particular the stimulated Brillouin effect, but also to limit the risk of intensity spikes due to speckle phenomena. Specifically, if the spectrum is broadened, temporal coherence and the capacity of light to interfere are reduced. This makes it possible to reduce the contrast of the speckle grains, and therefore intensity spikes.

In the examples illustrated in FIGS. 2A to 2D, the temporal shaping module 102 comprises a reflective device rotating about a given axis of rotation, configured so as to reflect said first incident pulses with Doppler spectral broadening.

Figure 2A:
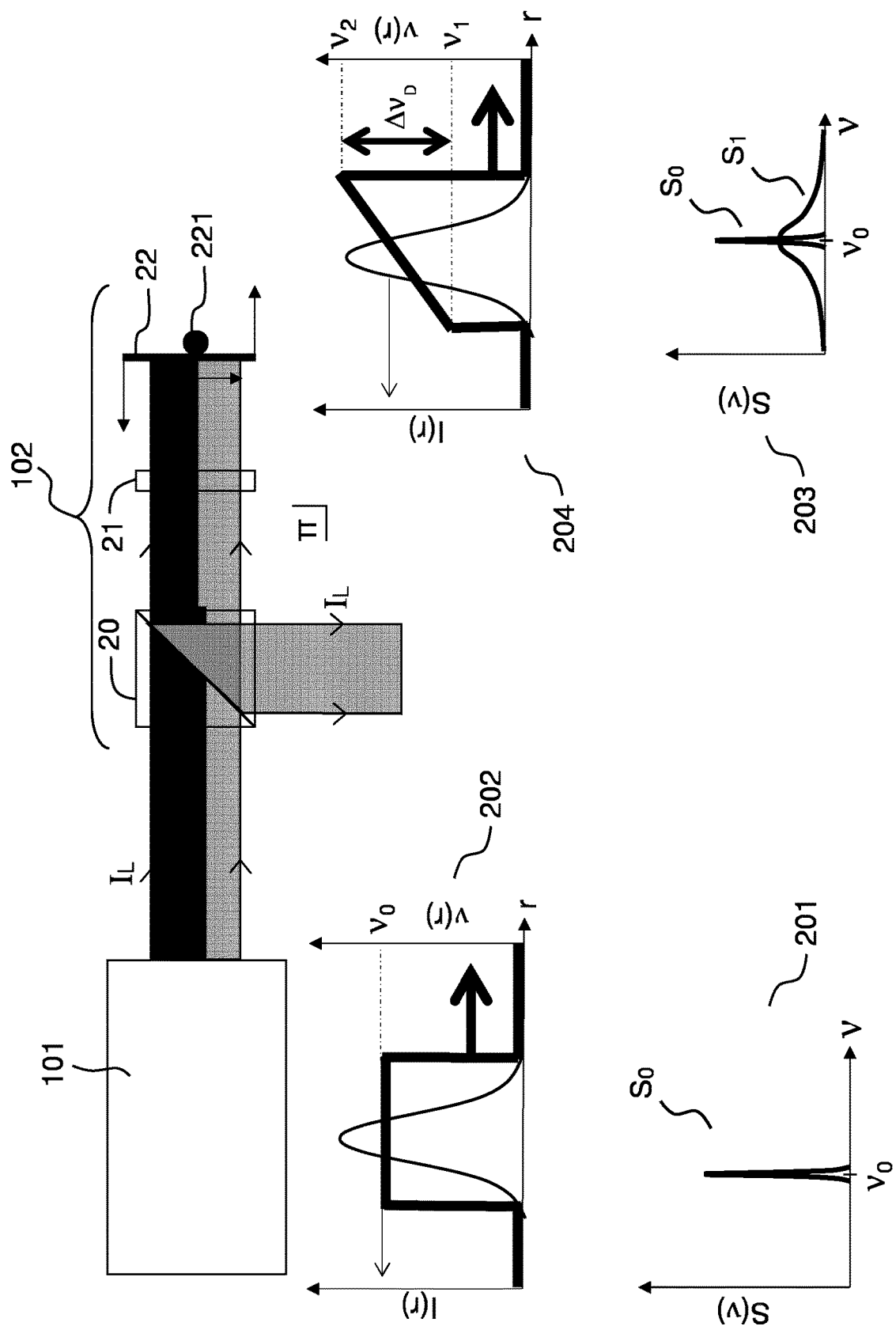
FIGS. 2A, 2B, 2C, and 2D show diagrams illustrating the temporal shaping of the pulses prior to transportation by the fiber device, in one example of a high-peak-power pulse generation system according to the present description, intended to broaden the laser line(s) through the Doppler effect.

In the example illustrated in FIG. 2A, the rotating reflective device comprises a simple mirror 22, arranged in a plane perpendicular to a plane of incidence Π of the first pulses $I_L$. The mirror 22 revolves about an axis of rotation 221 perpendicular to the plane of incidence Π and contained in the plane of the mirror. The rotating mirror may exhibit rotational or oscillating movement about the axis of rotation 221. If it is assumed that the pulses are emitted with a given repetition frequency, the rotational or oscillating speed of the mirror is synchronized such that each pulse is incident on the mirror 22 with the same angle of incidence. For example, the angle of incidence is 0° with respect to the normal to the mirror, as shown in FIG. 2A. The angle of incidence is not necessarily zero, but a zero angle is more advantageous in the case of a simple mirror.

In the example of FIG. 2A, a polarization splitter element 20 associated with a quarter-wave plate 21 makes it possible to split firstly the pulses incident on the rotating mirror 22 and secondly the pulses reflected by the mirror 22.

As shown in FIG. 2A, the pulses incident on the rotating mirror 22 have for example a spectrum $S_0$ centered on an optical frequency $v_0$ with a given spectral fineness (curve 201). Moreover, the curve 202 schematically indicates the spatial distribution of the intensity I(r) of an incident pulse (thin line) and the spatial distribution of the optical frequency v(r) (thick line). As may be seen on the curve 202, the spatial distribution of the optical frequency is constant, for example equal to $v_0$.

When a laser pulse is incident on the rotating mirror 22, it experiences a Doppler frequency shift $\Delta v_e$ that varies with the spatial profile of the beam. Specifically, in spatial terms, each point of the beam incident on the rotating mirror experiences a Doppler shift induced by the angular velocity of the mirror δθ/δt. Now, the angular velocity varies as a function of the distance r between a mirror point and the axis of rotation.

The curve 204 thus schematically illustrates the variation in the frequency v(r) of the reflected pulse resulting from the variable Doppler frequency shift $\Delta v_e$ as a function of r.

Let $D_f$ denote the diameter of the beam incident on the rotating mirror. The upper part of the beam located at a distance $r = D_f/2$ experiences a negative Doppler shift:

$$\Delta v_D\left(\frac{D_f}{2}\right) = v_0 - v_1,$$

where $v_0$ and $v_1$ are respectively the optical frequencies of the beam at the distances r=0 and r=$D_f/2$ from the axis of rotation. The lower part of the beam located at the distance r=−$D_f/2$ experiences a positive Doppler shift:

$$\Delta v_D\left(\frac{-D_f}{2}\right) = v_2 - v_0,$$

where v2 is the optical frequency of the beam at the distance r=−$D_f/2$ from the axis of rotation. It should be noted that the center of the beam located at a distance r=0 from the axis of rotation experiences zero Doppler shift.

In the case of the rotating mirror shown in FIG. 2A, it is possible to show that the total amplitude of the Doppler broadening $\Delta v_e$ is maximized when $D_f$=$D_M$ ($D_M$ diameter of the mirror). In this case, the amplitude of the Doppler shift is equal to:

$$\Delta v_D = \Delta v_D\left(\frac{D_f}{2}\right) - \Delta v_D\left(\frac{-D_f}{2}\right) = \frac{2\pi D_M}{\lambda} \cdot \frac{\delta\theta}{60}$$

δθ rotational or oscillating speed in RPM (1 RPM=a rad/min=2π/60 rad/s), λ, wavelength. It is assumed in this example $$\Delta v_D\left(\frac{D_f}{2}\right)$$

and $$\Delta v_D\left(\frac{-D_f}{2}\right)$$

correspond to the Doppler shifts experienced at each end of the mirror.

It is thus possible to associate, with each spatial coordinate r of the beam, a resulting optical frequency that is specific thereto. This spatially variable Doppler effect leads to spectral broadening of the laser line of the pulses (spectrum $S_3$), as illustrated on the curve 203.

Figure 2B:
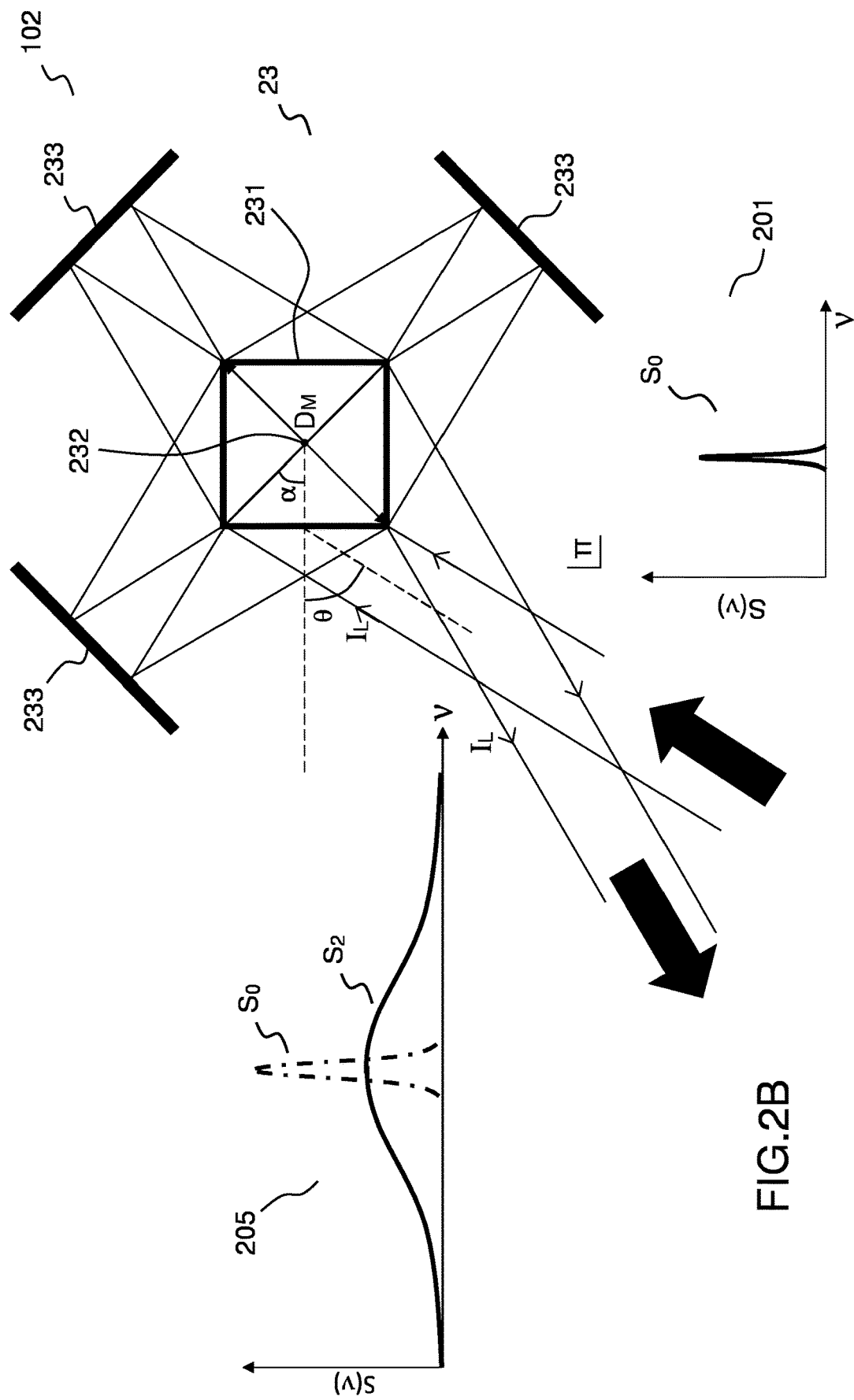
Figure 2C:
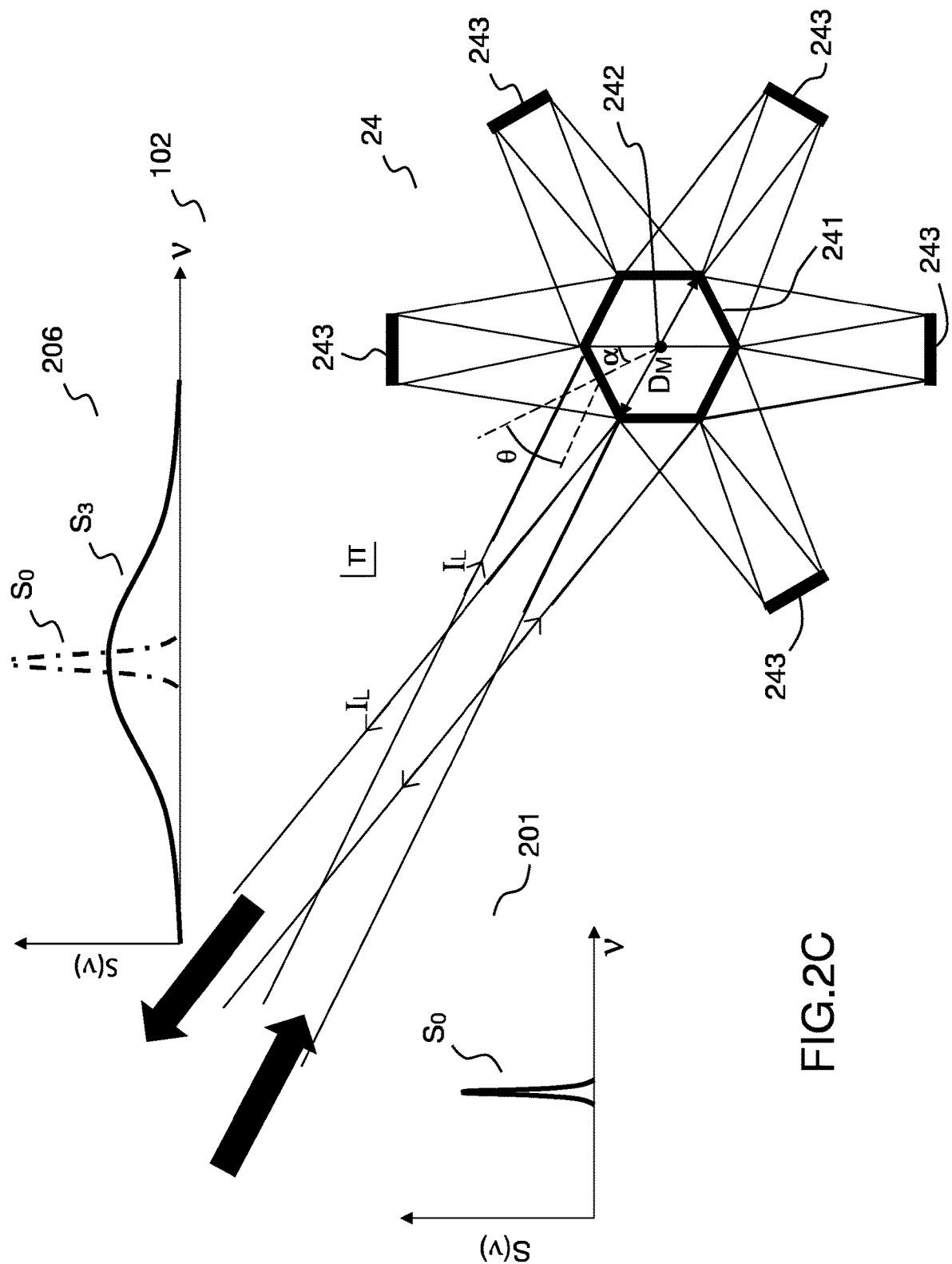
Figure 2D:
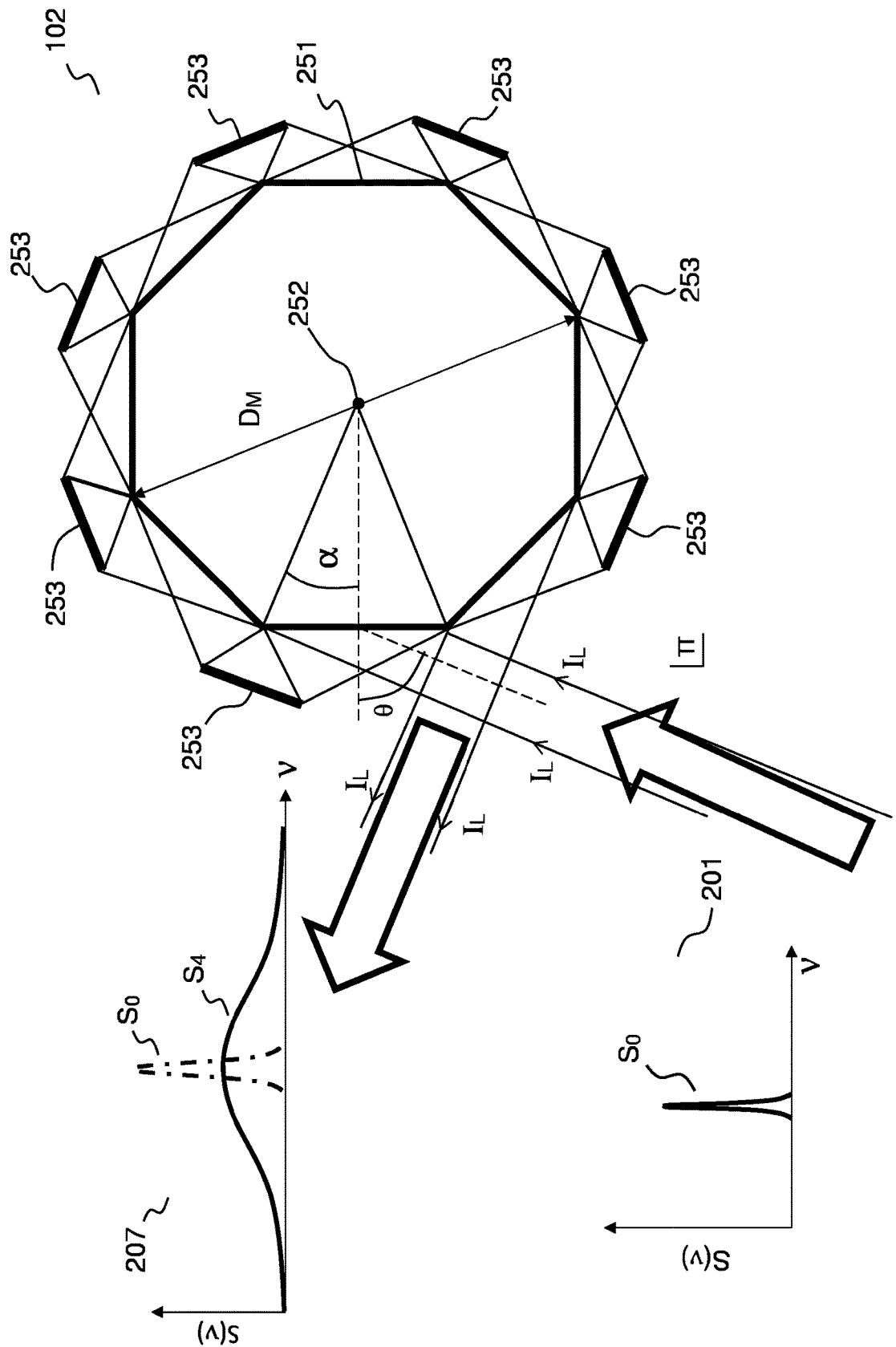

FIGS. 2B to 2D illustrate other examples of rotating reflective devices. In these examples, the rotating reflective device comprises a plurality of reflective surfaces arranged for example along the faces of a polygon. The rotating reflective device furthermore comprises fixed deflector mirrors for returning the laser pulses in order to return each pulse from one rotating reflective surface to the next. The reflective surfaces and the deflector mirrors are for example arranged in planes perpendicular to a plane of incidence Π comprising the directions of the wave vectors of the incident and reflected pulses, in order to maximize the Doppler shift effect. The reflective surfaces exhibit rotational or oscillating movement about a central axis of rotation, perpendicular to the plane of incidence, for example an axis passing through the barycenter of the polygon, in this example an axis of symmetry of the polygon. In the examples presented below, each face of the rotating polygon forms a reflective surface; the rotating reflective device thus comprises N reflective surfaces and N−1 deflector mirrors. It is also possible to have N reflective surfaces (N≥2) on a limited number of sides of the polygon, and always N−1 deflector mirrors. The applicant has shown that this particular "rotating polygon" configuration has made it possible to increase the Doppler broadening.

In the example of FIG. 2B, the rotating reflective device 23 comprises 4 reflective surfaces 231 arranged in a square, rotating about an axis of symmetry 232 and 3 deflector mirrors 233; In the example of FIG. 2C, the rotating reflective device 24 comprises 6 reflective surfaces 241 arranged in a hexagon, rotating about an axis of symmetry 242, and 5 deflector mirrors 243; In the example of FIG. 2D, the rotating reflective device 25 comprises 8 reflective surfaces 251 arranged in an octagon, rotating about an axis of symmetry 252, and 7 deflector mirrors 253. Generally speaking, the rotating reflective device may comprise N reflective surfaces, with N between 2 and 10, and N−1 deflector mirrors. In the examples illustrated in FIGS. 2B to 2D, the resulting spectra are respectively denoted $S_4$, $S_5$, $S_6$ (curves 205, 206, 207, respectively).

As illustrated in FIGS. 2B-2D, the laser pulses $I_L$ are incident on a reflective surface of the polygon with an angle θ with respect to the normal to the surface. The laser pulses are temporally synchronized with the rotation or oscillation of the rotating reflective device such that each incident pulse has the same angle of incidence with one of the reflective surfaces.

In order to maximize the spectral spread through the Doppler effect, provision may be made for the light beam formed from the laser pulses incident on each reflective surface to have a diameter less than or equal to:

$D_f = D_M \cdot \sin(\alpha) \cdot \cos(\theta)$

Where $D_M$ is an external diameter of the polygon in a direction perpendicular to the axis of rotation and α is the half-angle between the center of the polygon and one of these facets. The rotating reflective device has an angular velocity δθ, where θ is the angle of incidence of the beam with respect to the normal to a reflective facet. Each rotating facet will shift the frequency of the radiation that reflects there through the Doppler effect. As in the example of FIG. 2A, the Doppler shift experienced by the beam is different depending on the spatial profile of the beam. Specifically, in spatial terms, each point of the beam incident on a reflective face experiences a Doppler shift induced by the angular velocity of the reflective face. If the beam arrives in a direction perpendicular to the axis of rotation, the total amplitude of the Doppler broadening may be maximized. It is then determined using the below expression:

$$\Delta v_D = \Delta v_D\left(\frac{D_f}{2}\right) - \Delta v_D\left(\frac{-D_f}{2}\right) = \frac{2\pi D_M}{\lambda} \cdot \sin(\alpha)\cos(\theta)\frac{\delta\theta}{60}$$

By virtue of the polygonal geometry of the rotating reflective device, the light pulses may be reflected from each of the reflective faces of the polygon, and it is possible to increase the spectral spreading effect through the Doppler effect. Thus, for a polygon having N reflective faces, the spectrum of a line incident on the rotating reflective device will experience broadening due to the Doppler effect, expressed as follows:

$$\Delta v_D = \frac{N \cdot 2\pi D_M}{\lambda} \cdot \sin(\alpha)\cos(\theta)\frac{\delta\theta}{60}$$

For example, consideration is given to laser pulses at 1064 nm having a pulse duration of 20 ns and whose spectrum is limited by a Fourier transform (spectral width 50 MHz). If the laser pulse is temporally synchronized with an octagon rotating at 55000 rpm (rpm=rotations per minute, that is to say 5760 rad/s) having an external diameter of 40 mm, such that the angle of incidence between the laser beam and the normal to the surface to the polygons is always equal to $\theta=11.25°$ and the pulses reflect from the 8 reflective faces of the polygon, then the laser spectrum will be spread over approximately 690 MHz. The rotating reflective device will thus have made it possible to broaden the incident spectrum by a factor of 13.

Moreover, in addition to spreading the spectrum and reducing the temporal coherence of the laser pulses, the various spatial coordinates of the beam are associated with various spectral components, thereby making it possible to reduce spatial coherence. Such a temporal shaping module therefore makes it possible to minimize the peaks of intensity spikes caused by the spatio-temporal coherence of the source. Moreover, for a beam at 1064 nm of 20 ns and with a diameter of 15 mm, the diffraction limit is around 67 μrad. Now, during the duration of the pulse, if the polygon of 8 facets is rotating at 55000 RPM (5760 rad/s), the beam experiences sweeping during its duration of 20 ns equal to 115 μrad, or approximately twice the diffraction limit. This will help to minimize the contrast of the speckle.

Figure 3A:
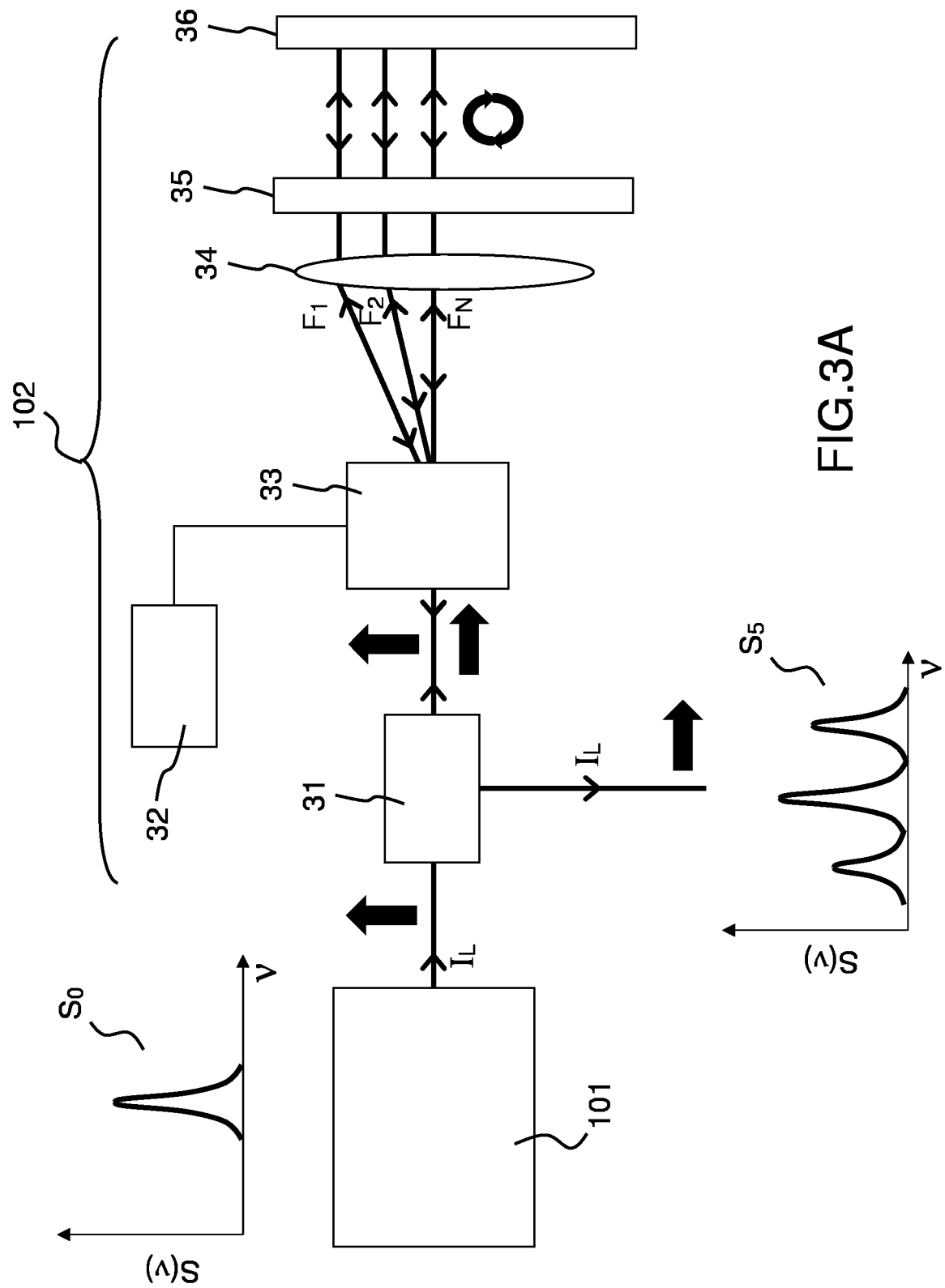

FIGS. 3A-3B illustrate examples of a temporal shaping module 102 intended to increase the number of laser line(s) of the laser pulses injected into the fiber device.

These examples make it possible to increase the number of laser lines, leading to a decrease in temporal coherence. This makes it possible in particular to increase the Brillouin threshold and to reduce the contrast of the speckle at the input of the fiber device.

The example of FIG. 3A is based on the use of an acousto-optic modulator 33 (AOM) using the acousto-optic effect to diffract and change the optical frequency of light by sound waves (generally close to radio frequencies).

More precisely, the module 102 comprises a polarization splitter cube 31 that transmits the linearly polarized laser pulses $I_L$, of spectrum $S_0$, to the acousto-optic modulator 33. The modulator 33 receives a signal originating from a polychromatic radiofrequency electric generator 32. Diffracted beams $F_1$, $F_2$, . . . originate from the modulator 33. If N radiofrequencies form the polychromatic RF signal delivered by the generator 32 and supplying the acousto-optic modulator 33, it is possible to have up to N beams diffracted in N different directions at the output of the modulator 33. Each diffracted beam is associated with a direction and has experienced a spectral shift corresponding to one of the N radiofrequencies forming the polychromatic RF signal delivered by the generator 32. The higher the RF frequency, the greater the spectral and angular shift experienced by the beam at the output of the modulator 33. Thus, an array of discrete beams are emitted at the output of modulator 33. This array of discrete beams may be recollimated by an optical system 34, for example an optical lens. The beams thus collimated pass through a quarter-wave plate 34 that converts the linear polarization into a circular polarization. A mirror 36 is arranged at the output of the quarter-wave plate so as to form a self-collimation configuration. This optical configuration allows a reverse return of the beams to the modulator 33. The return pulses pass through the plate 35. They then have a polarization at 90° to the initial polarization. Following the reverse path, they pass through the lens 34 again in order to be routed into the modulator 33. The beams will again experience angular and spectral shifts, the spectral shift on the return path being added to the spectral shift experienced on the outward path. Each of the spectrally shifted beams is returned to the polarization splitter cube 31 and directed to the fiber device (not shown in FIG. 3A). The resulting spectrum $S_1$ is broadened, as illustrated in the diagram of FIG. 3A, due to the various lines formed by the module 102 thus shown.

For example, if the polychromatic radiofrequency signal comprises 3 distinct radiofrequencies $v_1$, $v_2$, $v_3$, typically between 35 MHz and 350 MHz, the spectrum $S_1$ of the output pulses will comprise a comb of optical frequencies $v_0+2v_1$, $v_0+2v_2$, $v_0+2v_3$, where $v_0$ is the optical center frequency of the pulses emitted by the source 101. On the other hand, the output beam will have a single direction. If the laser pulses originating from the source 101 already comprise a plurality of lines, these lines will each be increased in number as described above. It should be noted that the bandwidth of the optical amplifiers under consideration is much greater than the shifts produced by the AOMs, and the laser pulses resulting from this temporal shaping may be amplified by the optical amplifier. For example, an Nd:YAG crystal has an amplification bandwidth of close to 30 GHz around 1064 nm.

Another assembly for increasing the number of lines of the first laser pulses is illustrated in FIG. 3B.

In this example, the temporal shaping module comprises an amplitude or phase modulator 37 configured so as to modulate the incident pulses $I_L$ in terms of intensity. The amplitude or phase modulator 37 comprises for example a Pockels cell. If the intensity is modulated with a polychromatic radiofrequency signal 38, the spectrum $S_2$ at the module output will be enriched with the spectral components originating from the polychromatic RF signal 38. This has the effect of broadening the spectrum by increasing the number of laser lines and the power spectral density of the pulses originating from the source 101.

The reduction in the PSD resulting from the increase in the number of laser lines, as described in the above examples, may range from a factor of 2 to a factor of 10. Thus, for example, it is possible, starting from a thin spectrum of typically 100 MHz spectral width, to obtain pulses whose total spectral width at the input of the fiber device is of the order of several hundred MHz, thereby making it possible to significantly reduce the Brillouin gain.

Of course, the methods presented above for reducing the PSD are not exhaustive and may be combined.

Figure 4A:
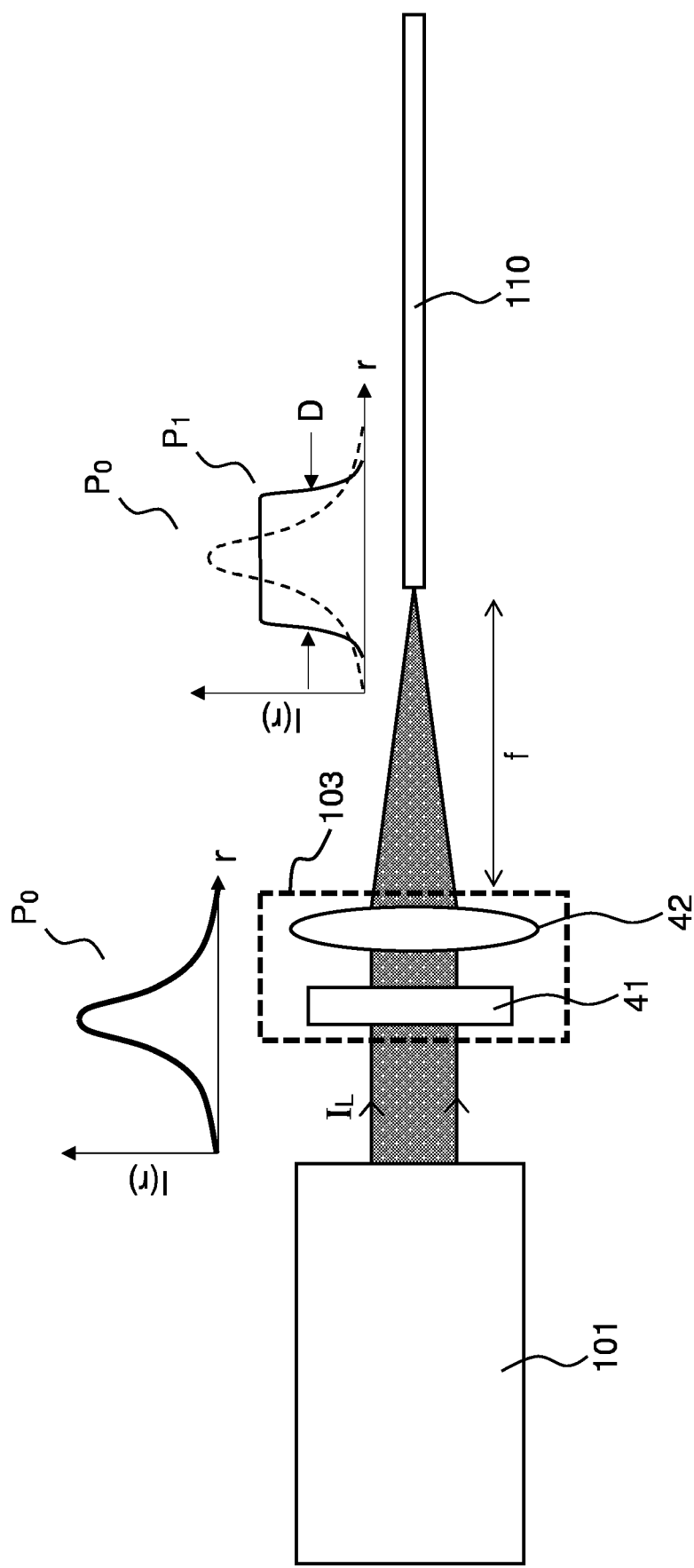
FIGS. 4A-4B show diagrams illustrating means for spatially shaping the pulses prior to transportation by the fiber device, in one example of a high-peak-power pulse generation system according to the present description, intended to form a beam with a constant intensity profile.
Figure 4B:
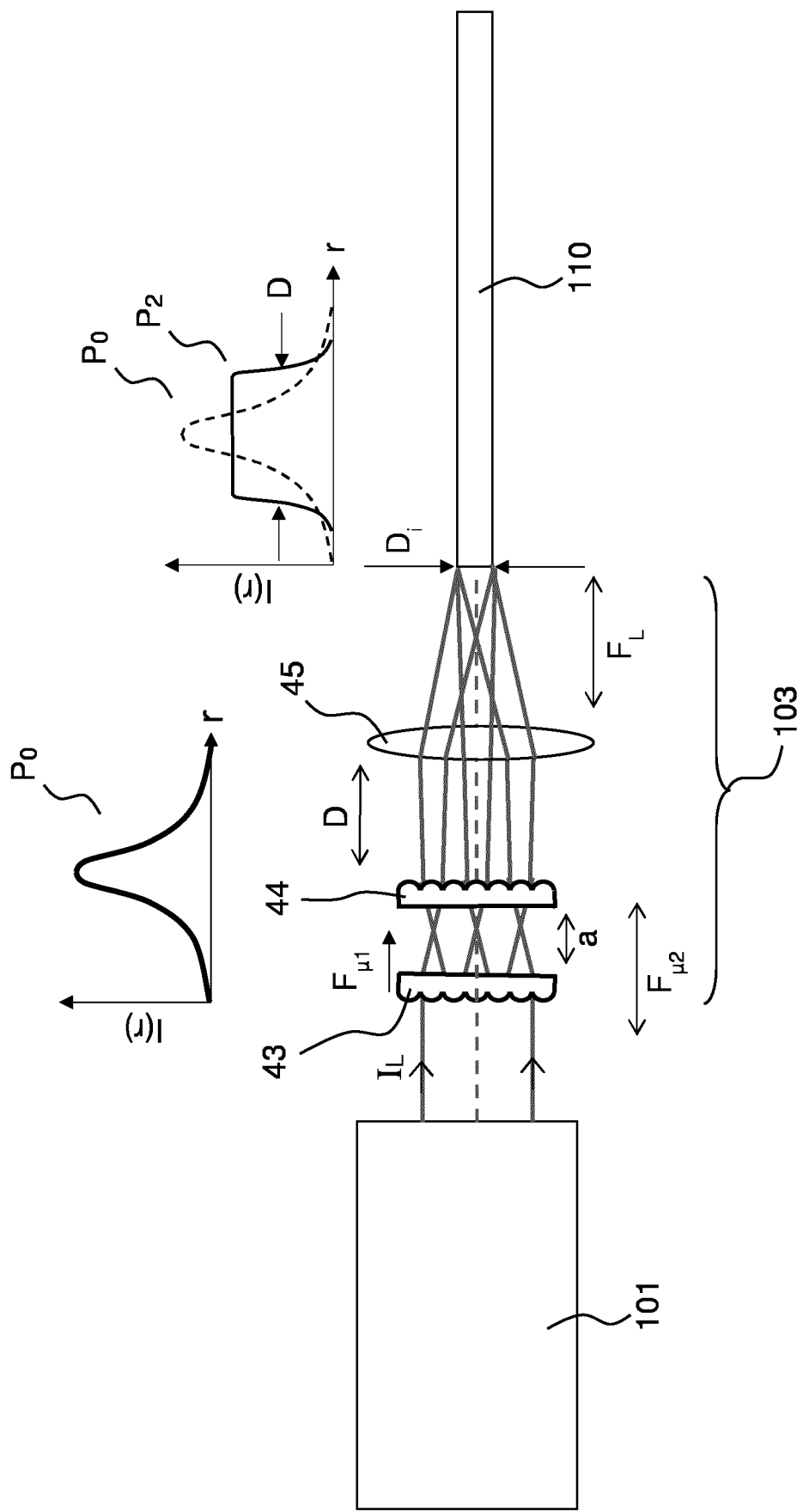

FIGS. 4A and 4B illustrate examples of spatially shaping the laser pulses $I_L$ prior to transportation by the fiber device.

These two examples aim to form a beam with a profile of substantially uniform intensity, of "top hat" type. For example, a spatial variation of the light intensity of +/−10% excluding granular effects linked to speckle may be sought.

FIG. 4A thus illustrates a first example of a shaping module 103 comprising a DOE (for "Diffractive Optical Element") 41 associated with an optical system 42, for example an optical lens, for performing spatial shaping tailored to the size and to the geometry of the fiber.

In FIG. 4A, the profile $P_0$ represents the profile of the intensity of the laser pulses emitted by a laser source, for example a Gaussian laser source. The applicant has shown that, with a "top hat" profile $P_1$, as shown in FIG. 4A, the risk of intensity spikes during propagation in the fiber device is reduced. The spatial shaping of the beam in the image plane of the optical system 42 corresponds to the spatial Fourier transform of the phase mask imposed by the DOE 41 convolved with the spatial Fourier transform of the intensity spatial distribution of the beam at the DOE. The phase mask imposed by the DOE 41 is thus calculated such that the result of this convolution forms a "top hat" intensity distribution, the diameter D of the beam being proportional to the focal length f of the optical system 42.

FIG. 4B illustrates another variant of a spatial shaping module 103. In this example, the spatial shaping is performed by way of a pair of microlens arrays 43, 44 and a converging lens 44.

The first microlens array 43 (focal length $F_{\mu 1}$) divides the incident beam into a multitude of sub-beams. The second microlens array 44 (focal length $F_{\mu 2}$) in combination with the converging lens 45 plays the role of an objective array that superimposes the images of each of the sub-beams in a plane called the "homogenization plane", located at the focal length $F_L$ of the converging lens. By modifying the distance between the two microlens arrays, the size of the shaping is changed. The geometry of the microlenses taken individually gives the shape of the image after the homogenization plane.

Spatial shaping as described by way of FIGS. 4A and 4B makes it possible, through comparison with a Gaussian profile, to reduce the intensity spikes at the input of the multimode fiber during propagation in the fiber device. Specifically, for one and the same energy and one and the same beam diameter, a "top hat" circular profile has a peak intensity lower than a Gaussian profile.

The decrease in the intensity spikes on the power profile of the laser pulses may also be obtained by reducing the temporal coherence of the pulses, as explained above.

Figure 5:
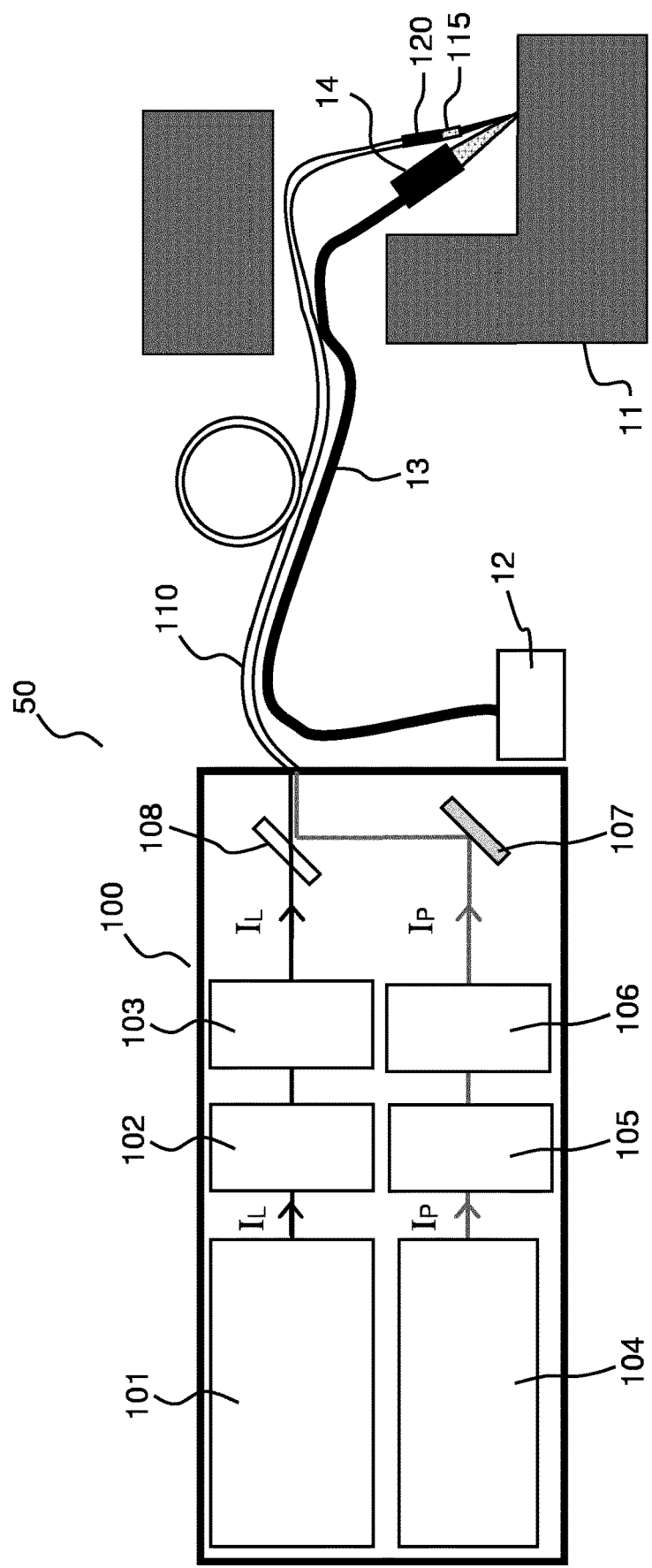
FIG. 5 shows a diagram of one example of a high-peak-power pulse generation system according to the present description, furthermore comprising an optical amplifier for amplifying said laser pulses at the output of the fiber device.

FIG. 5 illustrates one example of a system 50 according to the present description comprising all or some of the elements described with reference to FIG. 1 and furthermore comprising at least one first optical amplifier 120 arranged at the output of said fiber device 110 for optically amplifying said first laser pulses. A plurality of optical amplifiers may optionally be arranged in series. At the output of the or said optical amplifier(s), it is possible to spatially shape the amplified pulses by way of an element 115, as described with reference to FIG. 1.

The system 50 may also comprise at least one second laser amplifier for amplifying second laser pulses emitted by a second source at a wavelength different from the first source, where applicable.

The system 50 also comprises a light source 104 for emitting a pump beam $I_P$. The wavelength of the pump light source 104 depends on the wavelength of the pulses emitted by the source 101 and the optical amplifier 120 that is used. For example, if the laser source 101 emits at a wavelength around 1064 nm and the amplifier crystal of the optical amplifier 120 is an Nd:YAG crystal, the pump source 104 will be able to emit pump beams at a wavelength around 800 nm. If the laser source 101 emits at a wavelength around 1030 nm, and the amplifier crystal is a Yb:YAG amplifier crystal, then the pump source 104 will be able to emit the pump beams at a wavelength around 980 nm.

The pump laser source advantageously comprises one or more laser diodes.

The pump laser source 104 may emit pump beams in continuous (CW) or quasi-continuous (QCW) mode.

Temporal shaping by way of a temporal shaping module 105 makes it possible for example to modulate the pump beams in terms of intensity. Thus, for example, the pump beams are modulated at the repetition frequency of said first pulses. They may be kept at a constant or quasi-constant light intensity for a given duration, for example of the order of the time of the excited levels of the rare-earth ions that are used for the amplification phenomenon of the optical amplifier 120. Once this duration has passed, the intensity of the pump beams may be reduced to zero. It is also possible to spatially shape the pump beams, for example by way of a spatial shaping module 106, which makes it possible for example to safeguard the injection of the pump beams into the fiber device 110 by adapting the size of the optical mode of the pump beam to the core diameter of the first multimode fiber.

In the case of using pump laser diodes, the temporal shaping is performed by acting directly on the electrical control of the diode.

In the example of FIG. 5, the pump beam $I_P$ is injected into the fiber device 110 with the laser pulses $I_L$ by way of mirrors 107, 108, the plate 108 being for example a dichroic plate. The pump beam $I_P$ is copropagative with the laser pulses $I_L$, that is to say that the pump beam is injected into the fiber device 110. Copropagative pumping is particularly advantageous in order to maximize the overlap between the pump laser beam and the laser pulses to be amplified. The amplification process is thus more efficient and makes it possible to optimize the required pump energy.

As an alternative, the optical pumping may be transverse, performed for example by way of individual fiber laser diodes. This variant makes it possible to supply more pump energy by using for example one optical fiber per pump diode.

In all cases, as described above, it is possible to spatially shape the pulses at the output of the amplifier 120, for example by way of a component 115 as described with reference to FIG. 1, for example a diffractive optical component, for example a DOE (for "Diffractive Optical Element"), a microlens system, an optical condenser or a Powell lens.

Figure 6:
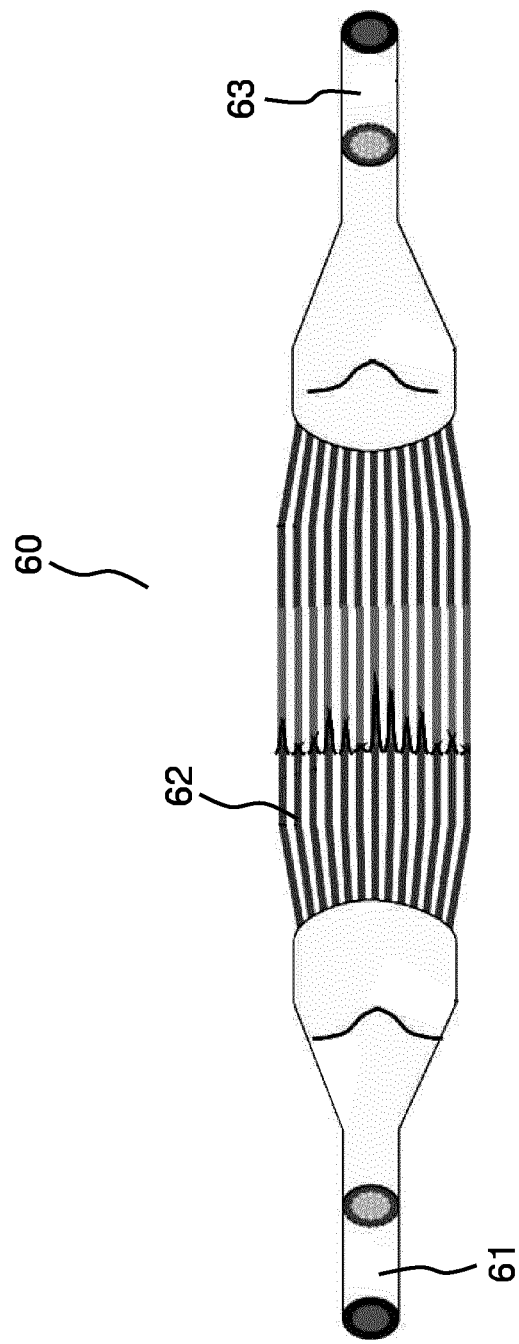
FIG. 6 shows a diagram of one exemplary embodiment of a fiber device in one example of a high-peak-power pulse generation system according to the present description.

FIG. 6 shows a diagram of one exemplary embodiment of a fiber device 60 in which two components, known by the term "photonic lantern", are arranged head-to-tail.

Each component or "photonic lantern" connects a multimode fiber core (at least 20000 modes) to a plurality of slightly multimode fibers (fewer than 10000 modes) having cores of smaller diameters. The arrangement of these components is described for example in the article by D. Noordegraaf. et al. ("*Multi-mode to single mode conversion in a 61 port photonic lantern*", Optics Express, Vol. 18, No. 5 (2010) pp. 4673-4678). The fiber device 60 described in FIG. 6 thus comprises, at input, said first multimode fiber 61, a set of slightly multimode fibers 62 coupled with said first multimode fiber, and, at output, a second multimode fiber 63, coupled with said slightly multimode fibers and comprising a single core for the output of said first laser pulses. There may for example be between 10 and 20, advantageously between 10 and 100 slightly multimode fibers.

Such a device may exhibit transmission losses, typically less than 15%, but has very great flexibility due to the use of slightly multimode fibers of smaller diameter (typically between 50 μm and 200 μm). Moreover, the losses may be compensated by using fibers 62 doped between the single-core injection and coupling sections (61, 63). These losses may also be compensated, according to one variant, by virtue of an optical amplifier at the output of the fiber device.

It is thus possible, by way of the fiber device 60, to inject high-energy laser pulses (typically >300 mJ for pulses of 10 ns) into a single core and to propagate said pulses to the area to be treated over a plurality of fibers of smaller diameter. Once the multifiber transport function has been performed, the optical radiation may be amplified, for example by way of the optical amplifier 120 as described in FIG. 5, and then delivered to the surface to be treated. By delivering the energy from a single core, the amplification and/or shaping of the beam by a diffractive optical component, for example a DOE, microlens system, optical condenser or Powell lens, is facilitated.

Furthermore, the fact that the input and the outputs of the fiber device are multimode fibers with large diameter cores (typically between 300 μm and 1 mm) safeguards sensitivity to laser-induced damage for the input and output faces of the fiber device.

Although they have been described through a certain number of detailed exemplary embodiments, the high-peak-power pulse generation methods and systems comprise various variations, modifications and refinements that will be obvious to those skilled in the art, it being understood that these various variants, modifications and refinements form part of the scope of the invention, as defined by the following claims.

The invention claimed is:

1. A high-peak-power laser pulse generation system, comprising:
    at least one first light source (101) for emitting first nanosecond laser pulses comprising one or more laser line(s);
    a fiber device for transporting said first laser pulses, comprising at least one first multimode fiber with a single core designed to receive said first laser pulses;
    a module for temporally shaping said first laser pulses, arranged upstream of the fiber device, configured so as to reduce the power spectral density of said pulses by reducing the temporal coherence, said temporal shaping module comprising a rotating reflective device rotating about a given axis of rotation, configured so as to reflect said first incident pulses with Doppler spectral broadening.

2. The laser pulse generation system as claimed in claim 1, wherein said rotating reflective device comprises at least one first reflective surface exhibiting rotational or oscillating movement about said axis of rotation.

3. The laser pulse generation system as claimed in claim 2, wherein, with said first pulses being emitted with a given repetition frequency, the rotational or oscillating speed of said at least one reflective surface is synchronized with said repetition frequency of the first pulses, such that each of said first pulses is incident on said at least one reflective surface with a constant angle of incidence.

4. The laser pulse generation system as claimed in claim 2, wherein said rotating reflective device comprises N reflective surfaces (N≥2) and N−1 deflector mirrors configured so as to return each of said first pulses from each of said reflective surfaces, all of said reflective surfaces exhibiting rotational or oscillating movement about said axis of rotation.

5. The laser pulse generation system as claimed in claim 1, wherein said temporal shaping module furthermore comprises means configured so as to increase the number of laser line(s) contained in said first pulses.

6. The laser pulse generation system as claimed in claim 1, furthermore comprising a module for spatially shaping said first laser pulses, arranged upstream of the fiber device, configured so as to standardize the power spatial density of said pulses.

7. The laser pulse generation system as claimed in claim 1, furthermore comprising at least one first optical amplifier arranged at the output of said fiber device for optically amplifying said first laser pulses.

8. The laser pulse generation system as claimed in claim 1, wherein said fiber device comprises, at input, said first multimode fiber, a set of slightly multimode fibers coupled with said first multimode fiber, and, at output, a second multimode fiber, coupled with said slightly multimode fibers and comprising a single core for the output of said first laser pulses.

9. The laser pulse generation system as claimed in claim 1, wherein said fiber device comprises at least one doped fiber for optically pre-amplifying said first laser pulses.

10. A high-peak-power laser pulse generation method, comprising:
    emitting first nanosecond laser pulses;
    transporting said first laser pulses via a fiber device comprising at least one first multimode fiber with a single core into which said first laser pulses are injected;
    temporally shaping said first laser pulses prior to transportation by the fiber device, said temporal shaping comprising reduction of the power spectral density by reducing the temporal coherence of said first laser pulses by way of a rotating reflective device rotating about a given axis of rotation, configured so as to reflect said first incident pulses with Doppler spectral broadening.

11. The laser pulse generation method as claimed in claim 10, furthermore comprising spatially shaping said first laser pulses prior to transportation by the fiber device, said spatial shaping comprising standardizing the power spatial density of said first laser pulses.

12. The laser pulse generation method as claimed in claim 10, furthermore comprising optically amplifying said first laser pulses by way of at least one first optical amplifier arranged at the output of the fiber device in order to form said high-peak-power laser pulses.

* * * * *